Feb. 25, 1930.                    C. W. FILBY                    1,748,283
                    REEL FOR ELECTRIC CABLES AND THE LIKE
                              Filed Sept. 7, 1928

INVENTOR.
Carlton W. Filby
BY
Fay, Oberlin & Fay
ATTORNEYS.

Patented Feb. 25, 1930

1,748,283

UNITED STATES PATENT OFFICE

CARLTON WARNER FILBY, OF JEFFERSON, OHIO

REEL FOR ELECTRIC CABLES AND THE LIKE

Application filed September 7, 1928. Serial No. 304,491.

The present improvements have more particular regard to reels for electric cables and the like and such improvements are primarily directed to the provision of a winding apparatus which consists of a stationary drum and a mechanically operated arm for rewinding a cable which has been previously unwound from such drum, this arm during unwinding of said cable operating to tension a spring which, when the cable is released revolves such arm in an operating direction to thereby rewind the cable around such drum. Further features are a centrifugally operated brake which is effective to control and regulate the speed of said arm during rewinding, pawl means for holding the winding arm in any desired position, and a guide which cooperates with the winding arm and is coaxially mounted with relation to the winding drum and the shaft which supports said arm, this guide functioning to cause the cable to leave and approach the center of the reeling mechanism in order to insure that such cable will be unwound and rewound in the contemplated manner.

To the accomplishment of the foregoing and related ends, said invention, then, consists of the means hereinafter fully described and particularly pointed out in the claims; the annexed drawings and the following description setting forth in detail certain structure embodying the invention, such disclosed means constituting, however, but one of various mechanical forms in which the principle of the invention may be used.

In said annexed drawings:—

Figure 1:
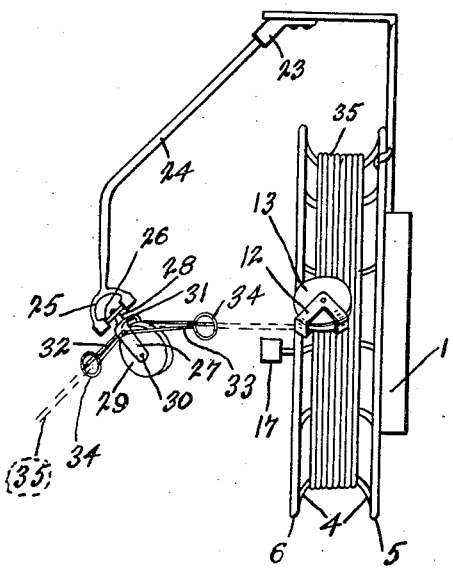
Figure 3:
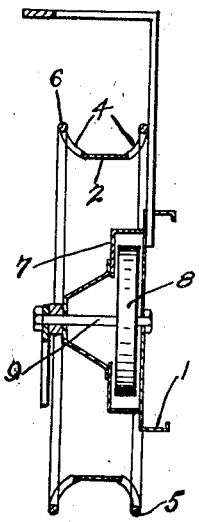
Figure 2:
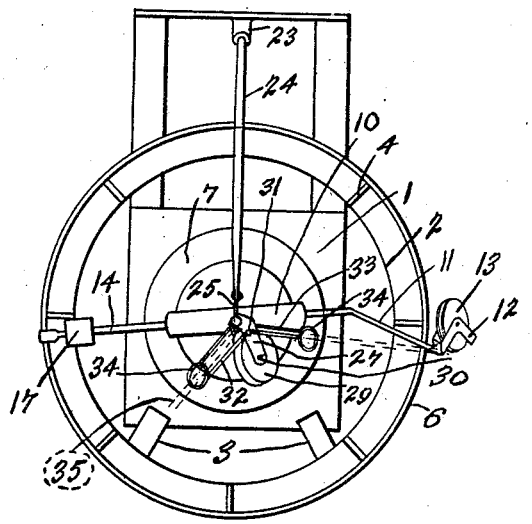
Figure 4:
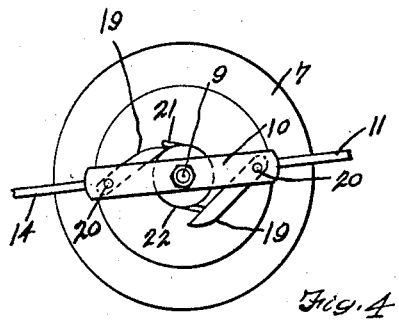
Figure 6:
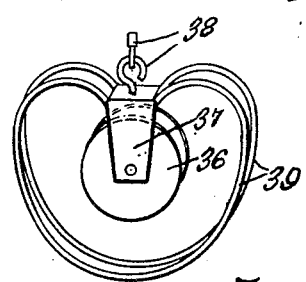
Figure 5:
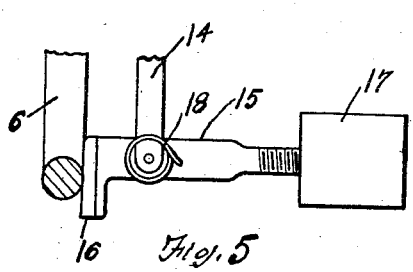

Fig. 1 is a side elevational view of a reeling apparatus embodying the present improvements; Fig. 2 is a plan view of the apparatus shown in Fig. 1; Fig. 3 is a section showing details of the arm operating spring and associated parts; Fig. 4 is a plan view particularly showing the pawl means employed for holding the winding arm against rotation by the reeling spring; Fig. 5 is a detail view of the centrifugal brake which prevents too rapid rotation of the winding arm; and Fig. 6 is a perspective view of a modified guide which may be used in place of that illustrated in Figs. 1 and 2.

As shown in the drawings, my invention consists of a base member 1, to which a drum 2 is attached by the radially extending brackets 3. Projecting in opposite directions from the drum 2 are a plurality of outwardly bent parts 4 which are connected by rings 5 and 6, such rings being somewhat larger in diameter than the drum 2, and together with the parts 4 forming a confining frame which insures that the cable will reel in the intended manner. Centrally and detachably mounted upon the base member 1 is a casing 7 which houses a winding spring 8 and encloses bearings for the lower end of a winding shaft 9. One end of the spring 8 is anchored to the casing 7 and its other end is secured to the shaft 9, this shaft extending through the top of such casing and carrying on its upper end a winding arm 10.

The winding arm 10 has an extension 11 which carries a bracket 12, and such bracket revolubly supports a pully 13 which lies in a plane inclined towards the guide pulley 14 and towards the winding drum 2. On an oppositely extending part 29 the winding arm 10 has a centrifugal brake which consists of a pivoted lever 15, a renewable friction shoe 16, and a weight 17. The weight is normally held in a position which prevents the shoe 16 from contacting with the ring 6 by a spring 18, but if the arm 10 revolves too rapidly this weight will be thrown outwardly by centrifugal force against the resistance offered by such spring and the shoe 16 will come into contact with the ring 6, thereby braking the motion of said arm and avoiding any damage to the cable.

For holding the arm 10 in any desired position the pawls 19 are provided, such pawls being pivoted to said arm as at 20 and being adapted to cooperate with a fixed stop 21 which is attached to a non-revoluble part 22. When in use, the winding reel is preferably positioned in a substantially vertical plane (Fig. 1) and the stop 21 is located as shown in Fig. 4. If the arm 10 is permitted to revolve fairly rapidly the pawls 19 will be thrown outwardly to a limited extent by centrifugal force and will not engage with the stop 21, but if such arm is compelled to revolve slowly the particular pawl which happens to be uppermost will fall due to its own weight and so come into engagement with said stop 21, thus holding the arm 10 until released by drawing off a short length of cable and then permitting such cable to rewind at a rate sufficient to throw such pawls outwardly and prevent their re-engaging with the stop.

Attached to the base member 1 is a bracket 22 which carries a pulley support 23, this support desirably consisting of a rod 24 having a forked end 25 which revolubly mounts a pin 26. The pulley 27 is carried on a pin 28 which revolubly connects with the pin 26 and such pulley has a sheave 29 mounted upon an axle 30. Pivotally connected to the pulley 27 as at 31 are two guide devices 32 and 33, each of which has an eye 34 through which the cable 35 passes as it approaches and leaves the sheave 29, such devices being free to move in every direction made necessary by the operation of the winding arm 10 and by the various possible directions which the cable may have or assume when being wound or unwound in the manner more fully hereinafter described. In Fig. 6 there is shown a modified arrangement which may be employed instead of the guiding apparatus just explained. This consists of a pulley 36 mounted within a block 37, such block having universal attaching parts and being provided with substantially circular guides 39 which are spaced apart to permit passage of a cable and have about the same function as the devices 32 and 33 previously explained.

In use, one end of the cable may be secured to the drum 2 and substantially its entire length then wound around such drum, its remote end being passed around the pulleys 13 and 27 (36) after the fashion shown in Fig. 1. When now the cable is unreeled, the arm 10 will be carried around or revolved and its shaft 9 will tension the spring 8, such spring being of sufficient length and strong enough to completely rewind the said cable when permitted to do so. It is intended that the operator shall keep the cable taut during its rewinding, but if such cable is completely released and the arm 10 tends to revolve at a speed which might cause damage to any part of the apparatus, the brake heretofore described will come into action and have the effect of preventing the winding arm from attaining such excessive rate of speed. The guiding devices are so constructed and mounted as to allow of the necessary shifting of the cable length intermediate such devices and the pulley 13, and are also arranged to permit the outer end of the cable to be pulled in most any desired direction. But during such cable movements friction upon the cable is prevented and its motion thereby made smoother, and abrasion or wear of its outside covering reduced to a minimum.

The arm 10 may be held in any desired position and any needed length of the cable thereby brought into use; the pawls 19 engaging with the stop 21 when the winding arm is compelled to turn slowly, and such pawls being thrown outwardly when said arm is permitted to revolve more rapidly.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. In an apparatus for reeling a cable, the combination of a stationary drum, spring operated means co-axially supported for winding a cable on such drum, and means for braking such winding means, said braking means being centrifugally actuated.

2. In apparatus for reeling a cable, the combination of a stationary drum, an arm co-axially supported for winding a cable on such drum, means for revolving said arm, and means for braking the motion of such arm, said last-named means being effective when the speed of such arm exceeds a predetermined maximum.

3. In apparatus of the character described, the combination of a drum, an arm revoluble about said drum for winding a cable thereupon, and means for guiding such cable to said arm, said means comprising a centrally positioned pulley.

4. In apparatus of the character described, the combination of a drum, means for winding a cable upon such drum, and means for guiding such cable to said winding means, said guiding means comprising a swiveling pulley.

5. In cable reeling apparatus, the combination of a drum, means revolubly mounted with relation to said drum for winding a cable on said drum, and means for guiding such cable as it approaches and leaves said winding means, said means comprising a swiveling pulley, and additional guide means for maintaining portions of such cable in the plane of said pulley.

6. In apparatus of the character described, the combination of a drum, revoluble means for rewinding a cable which previously had been rewound from such drum, a spring for turning said winding means, said spring being arranged to be tensioned by the unwinding of said cable and effective when so tensioned to rewind such cable, and means for controlling the motion of such winding means during rewinding of such cable, said controlling means comprising a pivoted lever having a weight on one end and a brake shoe on the other end, said weight being adapted to move said brake shoe when centrifugally actuated.

7. In a cable reeling apparatus, the combination of a stationary drum, co-axially supported spring operated means for rewinding a cable which has been previously unwound from such drum, and means for regulating the motion of such winding means during such rewinding.

8. In a cable reeling apparatus, the combination of a drum, a shaft mounted centrally with respect to said drum, a radially extending arm attached to said arm, and wheel means co-axial with said drum adapted to guide a cable relatively to said arm.

9. In a cable reeling apparatus, the combination of a winding drum, a revoluble arm for winding a cable upon said drum, means for guiding such cable to said winding arm, said guiding means comprising a pulley swiveled co-axial with said drum, and means carried by said arm for regulating its speed.

10. In a cable reeling apparatus, the combination of a winding drum, a revoluble arm for winding a cable upon said drum, means for guiding such cable relatively to said drum, said means comprising a pulley swiveled co-axial with said drum, a friction element for retarding excessive speed of said arm, and a weight pivotally mounted to actuate said friction element.

11. In a cable reeling apparatus, the combination of a drum, a revoluble arm co-axially supported for winding a cable upon said drum, a cable-guiding pulley swiveled co-axially with said drum, additional guides adjacent and movable with said pulley, a friction element pivotally mounted on said arm by a bell-crank lever, and a weight also carried by said lever and adapted to actuate the same centrifugally.

Signed by me, this 1st day of September, 1928.

CARLTON WARNER FILBY.